Nov. 3, 1931.  C. G. WILDERSON  1,830,151
DUST COLLECTOR AND GUARD FOR SAWS
Filed May 17, 1928   2 Sheets-Sheet 1
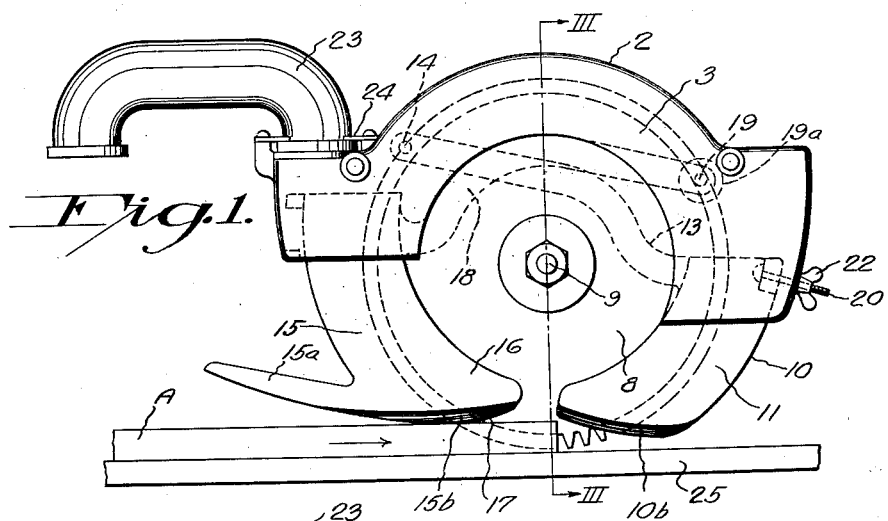
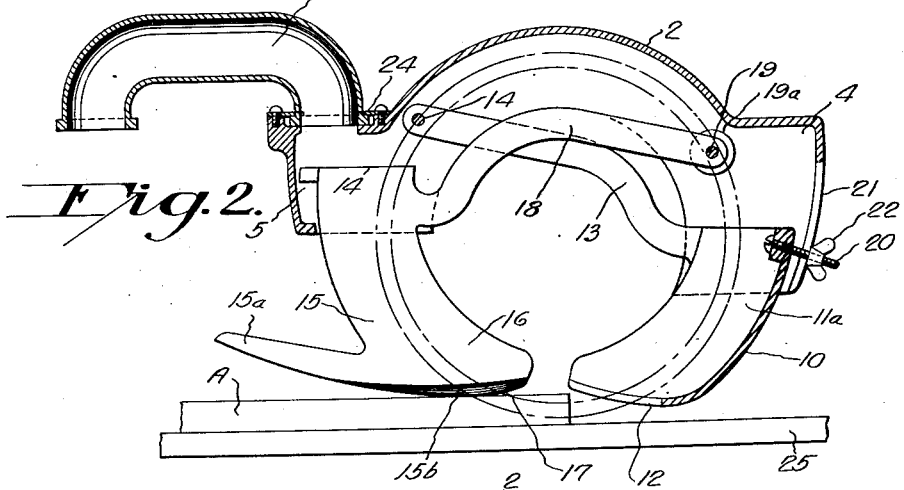
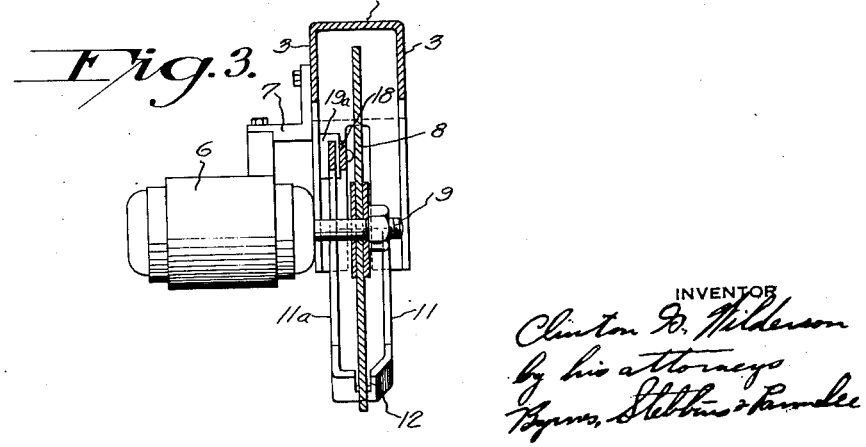

Nov. 3, 1931.     C. G. WILDERSON     1,830,151
DUST COLLECTOR AND GUARD FOR SAWS
Filed May 17, 1928     2 Sheets-Sheet 2
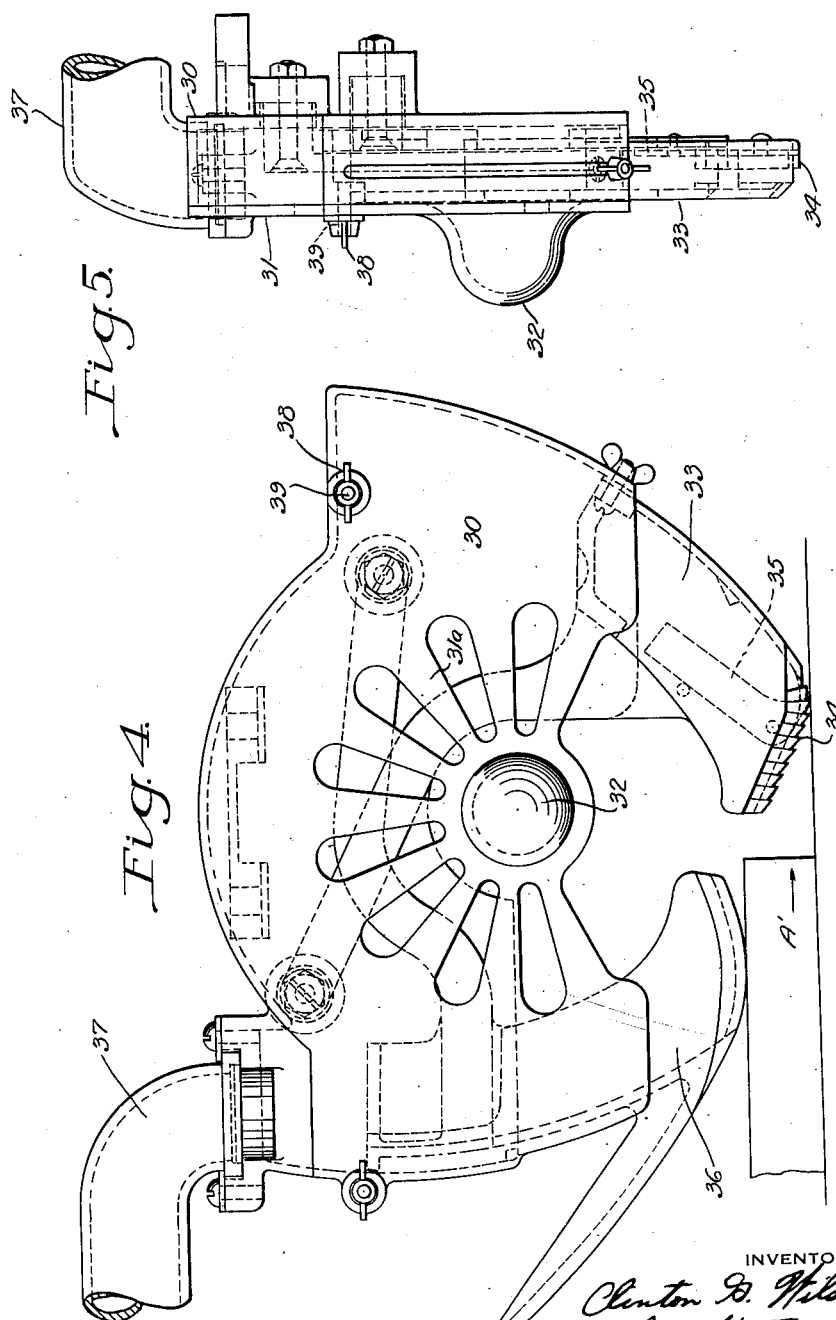

Patented Nov. 3, 1931

1,830,151

UNITED STATES PATENT OFFICE

CLINTON G. WILDERSON, OF LEETONIA, OHIO

DUST COLLECTOR AND GUARD FOR SAWS

Application filed May 17, 1928. Serial No. 278,548.

This invention relates to an improvement in saws, and particularly wood saws, and is for a combination guard and dust collector for saw blades.

The present invention has for its object to provide a saw guard which will effectively enclose the greater portion of the saw, and which will also serve to hold the piece of wood down during the operation of sawing, particularly when ripping. The current of air which is set in motion inside the guard by the saw revolving at high speed is utilized to carry off the sawdust.

The invention may be readily understood by reference to the accompanying drawings, in which Figure 1 is a front elevation of a saw blade having my invention applied thereto;

Figure 2 is a longitudinal section through the guard and dust and collector, one of the movable guard members being shown in elevation and one of them being shown in section;

Figure 3 is a transverse vertical section in the plane of line III—III of Figure 1;

Figure 4 is a side elevation of a slightly modified form of guard; and

Figure 5 is a side elevation of the guard shown in Figure 4.

In the drawings, 2 designates a main guard member having a flange 3 of each face thereof. The main guard member has an offset portion 4 at one side thereof and an offset portion 5 at the other side thereof. The member 2 is secured to a suitable support, such as the driving motor 6 for the saw by a rigid bracket 7. The saw blade is designated 8, and is mounted on the motor shaft 9.

At 10 is a vertically movable guard member which has side flanges 11 and 11ª thereon, and which has a slot 12 in the bottom portion thereof through which the saw blade 8 projects. The member 10 is carried on an arm 13 located in back of the saw blade 8 and pivotally secured to the main guard member at 14, as shown in Figure 2.

At 15 is a vertically movable guard member somewhat similar to the member 10, this guard member having side flanges 16 and having a slot 17 in the bottom thereof through which the saw blade projects. The member 16 is carried on a lever or arm 18 pivoted on a screw 19 and bearing against a boss 19ª inside the main guard member 2, the lever 18 extending in front of the lever 13 but being disposed in back of the saw blade, as viewed in Figure 1. The pivot point 14 is slightly further from the center of the saw than the pivot point 19 and is slightly above the pivot point 19.

The member 10 carries a bolt 20 that passes through a slot 21 in the offset portion 4 of the main guard member. On the bolt is a wing nut 22. The wing nut can be loosened to allow the member 10 to move up and down freely, or it can be tightened to clamp the member 10 in any position to which the same may be swung.

Swiveled on top of the offset portion 5 of the main guard member is a dust spout 23, the swiveled connection for the dust spout being shown at 24.

The member 15 carries a rearwardly projecting horn and extension 15ª.

The arrangement is such that ordinarily the members 15 and 10 are close to the top of the saw table 25. In the operation of ripping, a board A is fed into the saw from the direction of the arrow in Figure 1. The board first contacts with the extension 15ª lifting the guard member 15 up. The board then travels into contact with the saw and after moving past the center of the saw it strikes the guard member 10. The guard member 10 is raised by contact of the board therewith sufficiently to permit the board to pass thereunder. However, the guard member 10 floats or rides on the top surface of the board being sawn and serves to hold it down. Once the lumber is under the member 10 it is not possible to withdraw it as this member resists any reverse motion of the lumber to prevent the piece from flying back and striking the operator. this piece acting as a pawl to engage the piece and prevent its back travel. If it is necessary to withdraw the board, the member 10 can be raised manually by lifting up on the wing nut 22.

In the operation of cross sawing the board is fed to the saw from the opposite direction. The thumb screw 22 is first loosened and the member 10 set to the height necessary to clear the lumber to be sawed, after which the thumb screw is tightened. The board or lumber is thus first fed to the saw without contacting with the member 10 at all. After passing the center of the saw the lumber strikes the member 15 and lifts it. The curvature of the bottom of the member 15 is such that it will allow the wood to pass under it in either direction and drop down again into position after the board has been moved from beneath it.

With this arrangement, substantially the entire peripheral portion of the saw, with the exception of that part of the periphery nearest the saw table is enclosed. The rotation of the saw within the casing at high speed tends to force a current of air out the spout 23, and the sawdust is carried out the spout with this current of air. Ordinarily a rip saw located above the saw table throws the sawdust straight back into the face and against the clothing of the operator. With the present invention, all of this dust is blown out the spout 23 and the spout 23 can be adjusted to deliver the dust where it will not interfere with the operation of the saw.

The arrangement shown in Figures 4 and 5 is quite similar to the arrangement shown in Figures 1 to 3, but the main part of the casing 30 is provided with a removable blade 31 having a web-structure 31ª that supports a central hub 32 adapted to enclose and guard the end of the shaft 9 of the saw. In this figure the adjustable member 33 is preferably provided with teeth 34 on the lower edge thereof. These teeth are adapted to engage the surface of a board, such as A' moving in the direction of the arrow in Figure 4 to prevent the board from being kicked back by the action of the saw. The member 33 may also carry a pivoted member 35 adapted to engage the surface of the wood being sawed to prevent it from kicking back. The member 36 is similar to the member 15 described in connection with the structure shown in Figure 1. The adjustable dust spout is of the construction hereinbefore described, and is designated 37.

In order to permit the guard being applied to a saw wheel and to give access to the saw wheel when necessary, the plate 31 is made removable, and is preferably held in place by means of wing nuts 38 on bolts 39 carried by the main casting 30.

The device is particularly applicable to those types of saws wherein the saw is adjustably supported above the saw table and can be set at various angles with respect thereto. In order to allow the saw to be tilted, the bottoms of the guard members are provided with beveled surfaces 10ᵇ and 15ᵇ respectively, so that the guard members may ride on the surface of the board being cut, notwithstanding the angle to which the axis of the saw is tilted.

The entire structure can be easily and cheaply manufactured, and it can be easily mounted with respect to the saw. When mounted on the saw, it effectively guards the saw. The provision of the dust spout eliminates the throwing of sawdust up into the face of the operator and against the clothing of the operator, and thereby eliminates one objection which has always accompanied the use of a saw located over the saw table instead of under the saw table when the saw is used for ripping.

While I have shown a preferred embodiment of my invention, it will be understood that various changes and modifications may be made therein within the contemplation of my invention and under the scope of the following claims.

I claim:

1. The combination with a saw blade having its lower edge exposed for cutting, of a main guard member partly enclosing the periphery of the upper portion thereof, and an arcuately moveable guard member carried by the main guard member at each side of the center of the saw blade and projecting below the main guard member.

2. The combination with a saw blade having its lower edge exposed for cutting, of a main guard member partly enclosing the greater portion of the periphery thereof, an arcuately movable guard member carried by the main guard member at each side of the center of the saw blade, and clamping means for adjustably holding one of said guard members in position.

3. A guard for saw blades in wood-working machines in which the saw is positioned over the work comprising a main guard member adapted to enclose the upper portion of the periphery of a saw blade, a curved arm in the main guard member pivoted to one side thereof and extending across the interior thereof, an auxiliary guard member carried on said arm and projecting below the main guard member, and a second arm in the said main guard member oppositely disposed to the first, and an auxiliary guard on said second arm projecting below the main guard member.

4. The combination with a saw blade having its bottom portion exposed for cutting, of a guard comprising a main guard member, and a floating guard member at each side of the main guard member.

5. The combination with a circular saw blade having its bottom portion exposed for cutting, of a guard comprising a main guard member, and a floating guard member at each side of the main guard member, said guard members having curved bottom surfaces, and means for adjustably holding one of the floating guard members in a predetermined position.

6. The combination with a circular saw blade having its bottom portion exposed for cutting, of a guard comprising a main guard member, and a floating guard member at each side of the main guard member, said main guard member having a projecting portion thereon over one of the guard members and in which a portion of each of the guard members moves up and down, and a dust spout on the projecting portion.

7. A guard for saw blades operating above the work comprising a main guard member adapted to surround and enclose a greater portion of the periphery of a saw blade, and having a removable side plate thereon adapted to extend over the hub of the saw to which the guard is applied, and an arcuately movable guard member supported at each side of the main guard member.

8. The combination with a saw blade having the bottom portion thereof exposed for cutting, of a guard comprising a main guard member and a floating guard member at each side of the main guard member, one of said floating guard members having teeth on the bottom edge thereof.

9. A guard for a saw having its lower edge exposed for cutting, comprising a main guard member adapted to surround the upper portion of the saw blade, and an adjustable guard member depending from each side of said main guard member and adapted for enclosing the lower portion of the saw blade below the portion covered by the main guard member.

10. A guard for a saw blade having its lower edge exposed for cutting, comprising a main guard member adapted to enclose a greater portion of the periphery of the blade, and an arcuately movable guard member suspended from each side of the main guard member projecting below the main guard member and telescoping therewith.

11. A combined guard and dust collector for saws, comprising a main guard member adapted to enclose the greater portion of the periphery of a saw blade, adjustable guard members carried by the main guard member on each side thereof and projecting below the main guard member enclosing the lower portion of the saw, said main guard member having an offset portion over one of said adjustable guard members and a dust spout on the offset portion.

12. A guard for a saw blade comprising a main guard member, a lever pivotally mounted on the main guard member extending across the blade, and a movable guard member on said lever extending below the main guard member adapted to surround a portion of the periphery of the blade below the main guard member.

13. A guard for a saw blade having its lower edge exposed for cutting, comprising a main guard member, levers pivotally mounted on opposite sides of the main guard member and extending across the saw blade, and movable guard members on said levers adapted to substantially enclose the saw blade below the main guard member.

14. A guard for a saw blade having its lower edge exposed for cutting, comprising a main guard member adapted to enclose a greater portion of the periphery of the blade, and arcuately movable guard members pivotally attached to the main guard member at each side of the center of the saw adapted to substantially enclose the portion of the periphery of the saw blade extending below the main guard member.

15. A guard for a saw blade having its lower edge exposed for cutting, comprising a main guard member adapted to enclose a greater portion of the periphery of the blade, and arcuately movable guard members pivotally attached to the main guard member at each side of the center of the saw adapted to substantially enclose the portion of the periphery of the saw blade extending below the main guard member, said guard members being vertically movable.

16. A guard member for a saw blade having its lower edge exposed for cutting, comprising a main guard member adapted to enclose a greater portion of the periphery of the blade, and arcuately movable guard members pivotally attached to the main guard member at each side of the center of the saw adapted to substantially enclose the portion of the periphery of the saw blade extending below the main guard member, said members being vertically movable and telescoping with the main guard member and one of said guard members having clamping means thereon for adjustably holding it in a predetermined position.

17. A guard for a saw blade having its lower edge exposed for cutting, comprising a main guard member adapted to enclose a greater portion of the periphery of the blade, and guard members pivotally attached to the main guard member adapted to substantially enclose the portion of the periphery of the saw blade extending below the main guard member, said guard members being vertically movable and having bevelled faces thereon for engaging the work when the saw is tilted at various angles.

18. A combined guard and dust collector for saws, comprising a main guard member adapted to enclose a greater portion of the periphery of the saw blade, adjustable guard members pivotally attached to the main guard member on each side thereof projecting below the main guard member and substantially enclosing the portion of the periphery of the saw blade extending below the main guard member, said main guard member having an offset portion over one of said adjustable guard members and a dust spout on the offset portion.

In testimony whereof I have hereunto set my hand.

CLINTON G. WILDERSON.